United States Patent [19]

Hinrichs et al.

[11] Patent Number: 5,233,027
[45] Date of Patent: Aug. 3, 1993

[54] COPPER COMPLEXES OF SULPHO GROUPS CONTAINING DISAZO DYESTUFFS

[75] Inventors: Rolf Hinrichs, Leverkusen; Klaus Kunde, Neuenkirchen, both of Fed. Rep. of Germany

[73] Assignee: Bayer Aktiengesellschaft, Leverkusen, Fed. Rep. of Germany

[21] Appl. No.: 704,747

[22] Filed: May 23, 1991

[30] Foreign Application Priority Data

May 31, 1990 [DE] Fed. Rep. of Germany ....... 4017569

[51] Int. Cl.$^5$ .......................... C09B 45/28; D06P 1/10
[52] U.S. Cl. ..................... 534/716; 534/602; 534/717; 534/835; 8/437; 8/527; 8/918; 8/919
[58] Field of Search ..................... 534/716, 717, 835; 8/437, 527, 918, 919

[56] References Cited

U.S. PATENT DOCUMENTS 4,988,805  1/1991  Kunde .................................. 534/717

FOREIGN PATENT DOCUMENTS 3236238  5/1984  Fed. Rep. of Germany ...... 534/716
1-272882  10/1989  Japan .

OTHER PUBLICATIONS

Shimizu et al, *Chemical Abstracts*, vol. 112, No. 219079x (1990).

Suzuki et al, *Chemical Abstracts*, vol. 112, No. 57805b (1990).
Nippon, *Chemical Abstracts*, vol. 98, No. 73825f (1983).

*Primary Examiner*—Mary G. Lee
*Assistant Examiner*—Fiona T. Powers
*Attorney, Agent, or Firm*—Sprung Horn Kramer & Woods

[57] ABSTRACT

The new disazo dyestuffs of the formula (I)

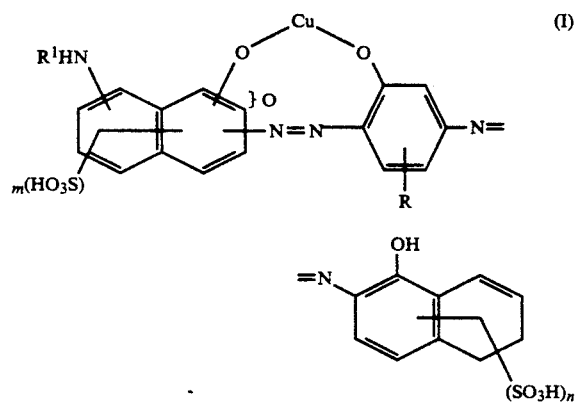

in which the substituents and indices have the meaning given in the description, and salts thereof are outstandingly suitable for dyeing cellulose-containing materials and leather in blue shades having good wet- and light-fastnesses.

6 Claims, No Drawings

COPPER COMPLEXES OF SULPHO GROUPS CONTAINING DISAZO DYESTUFFS

The present invention relates to new diasazo dyestuffs of the formula (I)

[Structure of formula (I): naphthalene with R¹HN and m(HO₃S) substituents, linked via Cu-O bridge to phenyl ring with N=N azo bond, then to another ring with R substituent and =N- linkage, then to naphthol with OH and (SO₃H)ₙ]

and salts thereof, in which
R represents hydrogen, alkyl or alkoxy,
R$^1$ represents hydrogen, alkyl, alkylcarbonyl, alkylsulphonyl, aryl, arylcarbonyl, arylsulphonyl, aralkyl, aralkylcarbonyl or aminocarbonyl,
m represents 1 or 2 and
n represents 1 or 2, and wherein the substituents mentioned can in turn be substituted by the non-ionic radicals customary in dyestuff chemistry and by carboxylic and sulphonic acid groups, and to processes for their preparation and their use for dyeing cellulose-containing materials and leather.

Preferred substituents or ranges for the radicals listed in the formulae mentioned above and below are detailed in the following:

Alkyl in the definition of R and R$^1$ in the general formulae and in combination terms such as alkylcarbonyl and alkylsulphonyl represents straight-chain or branched alkyl having, for example, 1 to 6, preferably 1 to 4, carbon atoms. Examples which may be mentioned are methyl, ethyl, n-propyl, i-propyl, n-butyl, s-butyl, i-butyl and t-butyl.

By the term alkoxy in the definition of R in the general formulae there is to be understood straight-chain or branched alkoxy having, for example, 1 to 6, in particular 1 to 4, carbon atoms. Examples which may be mentioned are methoxy, ethoxy, propoxy and butoxy, and their isomers i-propoxy and i-, s- and t-butoxy.

By the term unsubstituted or substituted aryl in the definition of R$^1$ in the general formulae or n combination terms such as arylcarbonyl and arylsulphonyl there is to be understood aryl having, for example, 6 to 10 carbon atoms in the aryl part. Examples which may be mentioned and preferred radicals are unsubstituted or substituted phenyl or naphthyl, in particular phenyl.

Unsubstituted or substituted aralkyl in the definition of R$^1$ in the general formula or in the combination term aralkylcarbonyl contains, for example, 1 to 6in particular 1 to 4, carbon atoms in the straight-chain or branched alkyl part and preferably phenyl as the aryl part. Examples which may be mentioned and preferred aralkyl groups are benzyl and phenethyl.

In formula (I), aryl is preferably understood as meaning phenyl and aralkyl is preferably understood as meaning benzyl.

Examples of non-ionic radicals are halogen, hydroxyl, $C_1$-$C_4$-alkoxy, acetoxy and, in the case of aryl radicals, also $C_1$-$C_4$-alkyl.

Preferred dyestuffs of the formula (I) are those in which
R represents hydrogen, $C_1$-$C_4$-alkyl or $C_1$-$C_4$-alkoxy,
R$^1$ represents hydrogen, $C_1$-$C_4$-alkyl, $C_1$-$C_4$-alkylcarbonyl, $C_1$-$C_4$-alkylsulphonyl, phenyl, phenylcarbonyl, benzyl, phenylsulphonyl or benzylcarbonyl, the phenyl radicals of which can be substituted by —SO₃H or —COOH, or aminocarbonyl,
m represents 1 or 2,
n represents 1 or 2 and
the sum of m and n is 2 or 3.

Particularly preferred dyestuffs in the context of the formula (I) are those of the formula (II)

[Structure of formula (II): symmetric copper complex with two naphthalene units linked by Cu-O bridges through central benzene ring via N=N azo bonds; R¹HN and m(HO₃S) on left naphthalene, OH and (SO₃H)ₙ on right naphthalene]

and salts thereof, in which
R$^1$ represents hydrogen, $C_1$-$C_2$-alkyl, $C_1$-$C_2$-alkylcarbonyl, $C_1$-$C_2$-alkylsulphonyl, phenyl or phenylcarbonyl, the phenyl radicals of which can be substituted by —SO₃H or —COOH, or aminocarbonyl,
m represents 1 or 2,
n represents 1 or 2 and
the sum of m and n is 2 or 3.

Dyestuffs which are to be singled out in particular in the context of the formula (I) are those of the formula (III)

[Structure of formula (III): copper complex with naphthalene (R¹HN, (HO₃S)ₚ) linked via Cu-O bridge to benzene ring with N=N azo, then to another ring with SO₃H and =N- linkage]

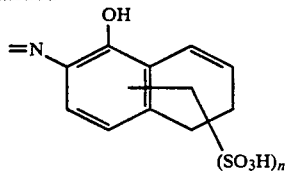

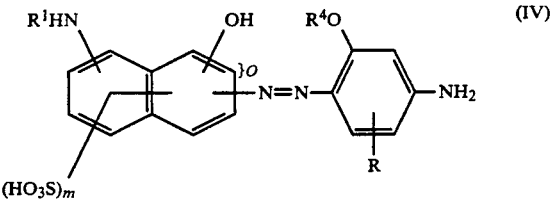

and salts thereof, in which
  $R^1$ represents hydrogen, $C_1$–$C_4$-alkyl, $C_1$–$C_4$-alkyl-carbonyl, $C_1$–$C_4$-alkylsulphonyl, phenyl, phenylcarbonyl, phenylsulphonyl or benzylcarbonyl, the phenyl radicals of which can be substituted by —$SO_3H$ or —COOH, or aminocarbonyl,
  n represents 1 or 2,
  p represents 0 or 1 and
  the sum of n and p is 1 or 2.

Dyestuffs which are to be especially singled out in the context of the formula (I) are those of the formula (III) in which
  $R^1$ represents methyl, ethyl, acetyl, propionyl, phenyl or phenylcarbonyl,
  n represents 1 and
  p represents 0.

The dyestuffs are in general employed for dyeing or also brought onto the market in the form of their salts, in particular the alkali metal salts (Li, Na or K), the ammonium salts or the mono-, bis- or tris-$C_1$–$C_4$-alkyl-ammonium salts, and in particular also the $C_1$–$C_4$-alkanol-ammonium salts.

Preferred ammonium salts in this context are those having the cation

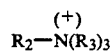

wherein
  $R_2$ is H, $C_1$–$C_4$-alkyl, which is optionally substituted by OH, or hydroxy-$C_1$–$C_4$-alkoxy, in particular $CH_3$, $C_2H_5$, $CH_2$—$CH_2$—OH, $CH_2$—CH(OH)$CH_3$ or $CH_2$—$CH_2$—$OCH_2$—$CH_2$—OH and
  $R_3$ is $C_1$–$C_4$-hydroxyalkyl or $C_1$–$C_4$-hydroxyalkoxyalkyl, in particular $CH_2$—$CH_2$—OH, $CH_2$—CH(OH)$CH_3$ or $CH_2$—$CH_2$—$OCH_2$—$CH_2$—OH.

The dyestuffs can also be employed as concentrated aqueous solutions having a content of 5 to 30%, preferably 10 to 20%.

The new disazo dyestuffs of the formula (I) can be prepared by a process in which compounds of the formula (IV)

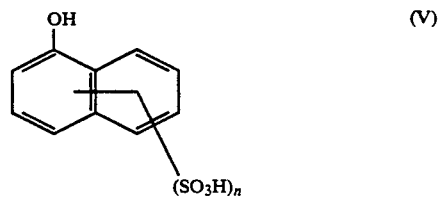

in which
  R, $R^1$ and m have the abovementioned meaning and
  $R^4$ represents $C_1$–$C_4$-alkyl,
are diazotised, the diazotisation products are coupled with compounds of the formula (V)

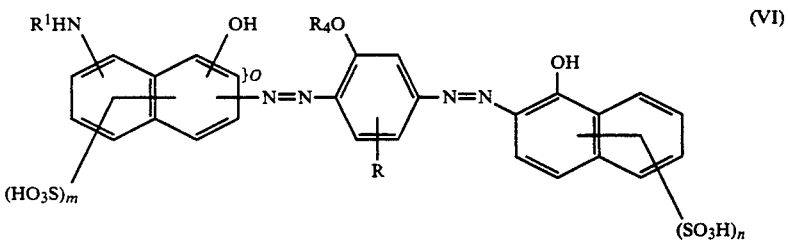

in which
  n has the abovementioned meaning,
and the dyestuffs thus obtained, of the formula (VI)

in which
  R, $R^1$, $R^4$, m and n have the abovementioned meaning,
are treated with copper(II) salts.

The compounds of the formula (IV) are obtained in a manner which is known per se, for example by reduction of the compounds of the formula (VII)

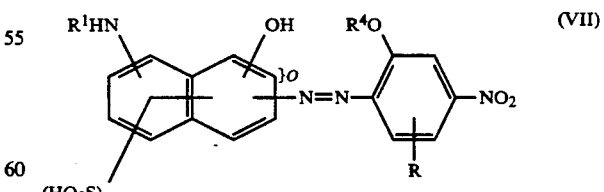

in which
  R, $R^1$, $R^4$ and m have the abovementioned meaning, for example with sodium sulphide or ammonium sulphide.

The compounds of the formula (VII) are obtainable by diazotisation of compounds of the formula

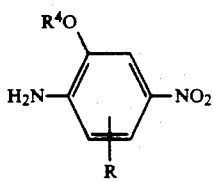

(VIII)

in which

R and $R^4$ have the abovementioned meaning,
and coupling of the diazotisation products with naphthol-sulphonic acids of the formula (IX)

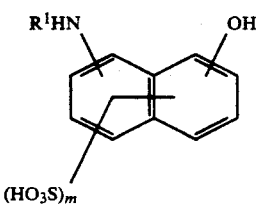

(IX)

in which $R^1$ and m have the abovementioned meaning.

Examples of compounds of the formula (IX) are N-acetyl and N-benzoyl derivatives of the following aminonaphtholmono- and -disulphonic acids.
4-hydroxy-6-aminonaphthalene-2-sulphonic acid,
4-hydroxy-7-aminonaphthalene-2-sulphonic acid,
5-hydroxy-4-aminonaphthalene-1-sulphonic acid,
4-hydroxy-5-aminonaphthalene-2-sulphonic acid,
4-hydroxy-8-aminonaphthalene-2-sulphonic acid,
4-hydroxy-7-aminonaphthalene-1-sulphonic acid,
4-hydroxy-6-aminonaphthalene-1-sulphonic acid,
4-hydroxy-7-aminonaphthalene-1,5-disulphonic acid,
5-hydroxy-2-aminonaphthalene-1,7-disulphonic acid,
5-hydroxy-3-aminonaphthalene-2,7-disulphonic acid,
4-hydroxy-5-aminonaphthalene-2,7-disulphonic acid,
5-hydroxy-4-aminonaphthalene-1,7-disulphonic acid,
5-hydroxy-4-aminonaphthalene-1,3-disulphonic acid,
4-hydroxy-6-methylaminonaphthalene-2-sulphonic acid,
4-hydroxy-7-methylaminonaphthalene-2-sulphonic acid,
and the free aminonaphtholsulphonic acids:
4-hydroxy-6-anilinonaphthalene-2-sulphonic acid,
4-hydroxy-7-anilinonaphthalene-2-sulphonic acid and
4-hydroxy-6-(3-sulphonphenylanilinonaphthalene)-2-sulphonic acid.

The following hydroxynaphthalenemono- and -disulphonic acids, for example, are used as coupling components of the formula (V):
4-hydroxynaphthalene-1-sulphonic acid,
5-hydroxynaphthalene-1-sulphonic acid,
4-hydroxynaphthalene-2-sulphonic acid,
4-hydroxynaphthalene-2,7-disulphonic acid,
4-hydroxynaphthalene-1,5-disulphonic acid and
4-hydroxynaphthalene-2,5-disulphonic acid.

The compounds of the general formula (IV) can be diazotised directly or indirectly. The coupling is carried out at pH values of between 6 and 10, preferably between 8 and 9, at temperatures between 0° C. and 30° C.

The acylamino groups $NHR_1$ can be converted into the free amino group by known processes.

The conversion into the copper complexes is carried out in a manner which is known per se by heating the dye-stuffs of the general formula (VI) in aqueous solution with copper(II) salts, for example copper (II) sulphate or copper(II) acetate, in the presence of a base, for example an alkanolamine.

The dyestuffs are isolated and dried, for example, after addition of salt. However, it is also possible for the coupling solutions or suspensions to be passed over a roller drier or spray drier.

Concentrated aqueous solutions can equally well be prepared from the moist pastes of the dyestuffs, for example by subjecting suspensions of these dyestuffs in water to desalination, for example by pressure permeation.

The dyestuffs dye cellulose-containing materials, in particular paper, cotton and viscose, as well as leather, in blue shades having good wet- and light-fastnesses.

The dyestuffs can be used by all the processes customary for substantive dyestuffs in the paper and textile industry, in particular in pulp and surface dyeing of paper for sized and non-sized grades, starting from bleached or unbleached cellulose of various origins, such a conifer or deciduous sulphite and/or sulphate cellulose. They can also be used for dyeing yarn or piece goods of cotton, viscose and linen by the exhaustion process from a long liquor or in continuous processes.

For dyeing leather, the dyestuffs are preferably used as liquid preparations, which are similarly suitable for spray-dyeing and for dyeing in a vat and on continuous multipurpose machines.

The dyeings on paper which are obtained using the dyestuffs according to he invention are distinguished by good light- and wet-fastness (fastness to bleaching) as well as acid-, alkali- and alum-fastness. The brilliance and clarity of the colour shades is also to be pointed out. The properties of combinations with suitable dyestuffs is furthermore very good.

EXAMPLES

Example 1

62.3 g of the compound of the formula

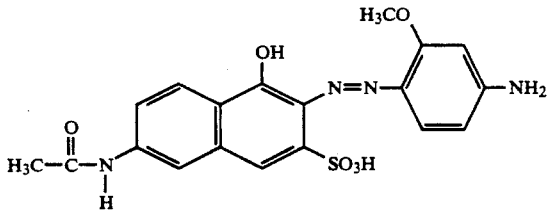

are dissolved in
  800 ml of water under neutral conditions, and
  10 g of $NaNO_2$ are added; this solution is added dropwise at 0° C. to 5° C. to a mixture of
  50 ml of concentrated hydrochloric acid and
  200 g of ice.
32.4 g of 4-hydroxynaphthalene-1-sulphonic acid are dissolved in
  400 ml of water containing
  8 of NaOH at 10° C. The suspension of the diazonium compound is slowly added to this solution, during which the pH is kept at between 7 and 8 by addition of sodium carbonate solution. After the coupling, a solution
  40 g of copper sulphate×5 $H_2O$ in
  200 ml of water and 80 g of diethanolamine is added to the dyestuff solution at 50° C. and the mixture is then stirred at 95° C. for 10 h. When the coppering has ended, the dyestuff is precipitated by addition of 250 g of salt, isolated and dried.

It dyes cotton, viscose staple, paper and leather in blue shades.

Examples 2 to 7

If, instead of the coupling component employed in Example 1, equimolar amounts of
5-hydroxynaphthalene-1-sulphonic acid,
4-hydroxynaphthalene-2-sulphonic acid,
8-hydroxynaphthalene-1-sulphonic acid,
4-hydroxynaphthalene-2,7-disulphonic acid,
4-hydroxynaphthalene-1,5-disulphonic acid or
4-hydroxynaphthalene-2,5-disulphonic acid
are used, copper complex dyestuffs which dye cotton, viscose staple, paper and leather in blue shades are likewise obtained.

Examples 8 to 14

The procedure is an in Examples 1 to 7, but when the coppering has ended 64 g of NaOH are added and the mixture is heated at 95° C. for three hours, during which the acetyl radicals are split off, before the product is precipitated and isolated, to give a dyestuff which dyes cotton, viscose staple, paper and leather in blue shades.

Example 15

71.3 g of the compound of the formula

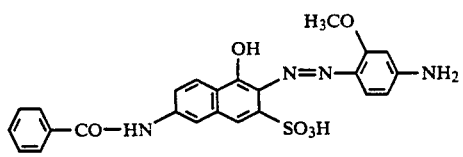

are dissolved in
2,000 ml of water under neutral conditions, and
10 g of NaNO$_2$ are added; this solution is added dropwise at 0° C. to 5° C. to a mixture of
50 ml of concentrated hydrochloric acid and
500 g of ice.
44.1 g of 4-hydroxynaphthalene-2,7-disulphonic acid are dissolved in
500 ml of water at 10° C. under neutral conditions; the suspension of the diazonium compound is added dropwise to this solution, during which the pH is kept at between 7 and 8 with the aid of sodium carbonate solution. After the coupling, a solution of
40 g of copper sulphate×5 H$_2$O in
200 ml of water and
80 g of diethanolamine is added to the dyestuff solution at 50° C. and the mixture is then stirred at 95° C. for 10 hours. When the coppering has ended, the dyestuff is precipitated by addition of
450 g of salt, isolated and dried.

It dyes cotton, viscose staple, paper and leather in blue shades.

Example 16 to 21

If, instead of the coupling component employed in Example 15, equimolar amounts of
4-hydroxynaphthalene-2-sulphonic acid,
5-hydroxynaphthalene-1-sulphonic acid,
8-hydroxynaphthalene-1-sulphonic acid,
4-hydroxynaphthalene-2,7-disulphonic acid,
4-hydroxynaphthalene-1,5-sulphonic acid or
4-hydroxynaphthalene-2,5-disulphonic acid
are used, copper complex dyestuffs which dye cotton, viscose staple, paper and leather in blue shades are likewise obtained.

Example 22

67.2 g of the compound of the formula

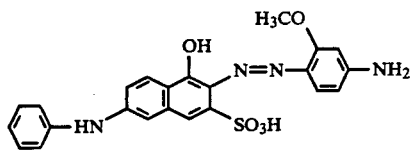

are dissolved in
2,000 ml of water under neutral conditions, and
10 g of NaNO$_2$ are added; this solution is added dropwise at 0° C. to 5° C. to a mixture of
50 ml of concentrated hydrochloric acid and
500 g of ice.
32.4 g of 4-hydroxynaphthalene-1-sulphonic acid are dissolved in
500 ml of water at 10° C. under neutral conditions; the suspension of the diazonium compound is added dropwise to this solution, during which the pH is kept at between 7 and 8 with the aid of sodium carbonate solution. After the coupling, a solution of
40 g of copper sulphate×5 H$_2$O in
200 ml of water and
80 g of diethanolamine is added to the dyestuff solution at 50° C. and the mixture is then stirred at 95° C. for 10 hours. When the coppering has ended, the dyestuff is precipitated by addition of
450 g of salt, isolated and dried.

It dyes cotton, viscose staple, paper and leather in blue shades.

Examples 23 to 28

If, instead of the coupling component employed in Example 22, equimolar amounts of
5-hydroxynaphthalene-1-sulphonic acid,
4-hydroxynaphthalene-2-sulphonic acid,
8-hydroxynaphthalene-1-sulphonic acid,
4-hydroxynaphthalene-2,7-disulphonic acid,
4-hydroxynaphthalene-1,5-disulphonic acid or
4-hydroxynaphthalene-2,5-disulphonic acid
are employed, copper complex dyestuffs which dye cotton, viscose staple, paper and leather in blue shades are likewise obtained.

We claim:

1. A disazo dyestuff of the formula

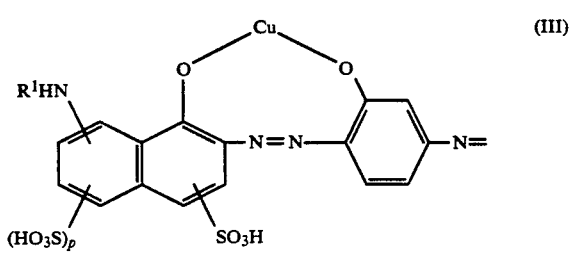

(III)

-continued

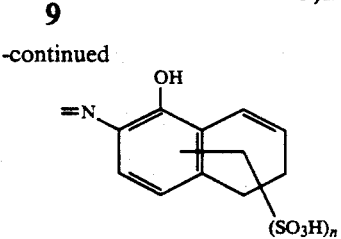

or a salt thereof, in which
R[1] represents hydrogen, $C_1$–$C_4$-alkylcarbonyl, or phenylcarbonyl,
n represents 1 or 2,
p represents 0 or 1 and the sum of n and p is 1 or 2.

2. A dyestuff of claim 1, wherein
R[1] represents hydrogen, acetyl, propionyl or phenylcarbonyl,
n represents 1 and
p represents 0.

3. A dyestuff of claim 1, of the formula

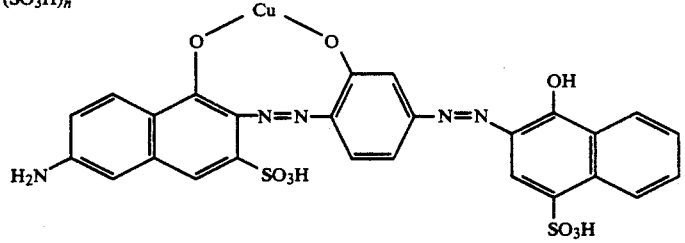

or a salt thereof.

4. A process for dyeing cellulose-containing materials, in which a dyestuff of claim 1 is used.

5. A process for dyeing leather in which a dyestuff of claim 1 is used.

6. A concentrated aqueous dyestuff solution which contains a dyestuff of claim 1.

* * * * *

UNITED STATES PATENT AND TRADEMARK OFFICE
CERTIFICATE OF CORRECTION

PATENT NO. : 5,233,027

DATED : August 3, 1993

INVENTOR(S) : Hinrichs, et al.

It is certified that error appears in the above-identified patent and that said Letters Patent is hereby corrected as shown below:

Title Page ABSTRACT line 3 & Col. 1 line 20     Delete " 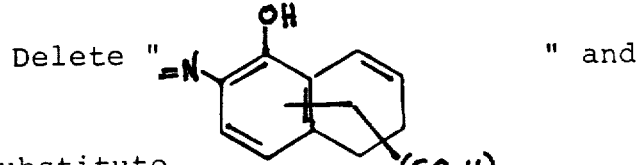 " and substitute -- 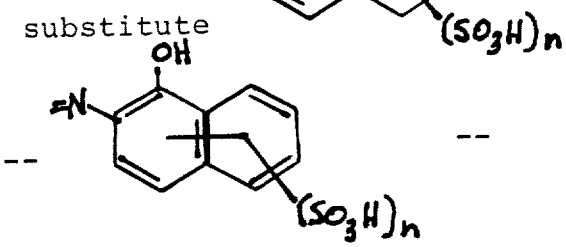 --

Col. 3, line 5     Delete " 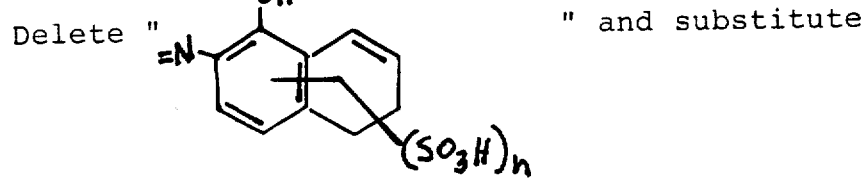 " and substitute -- 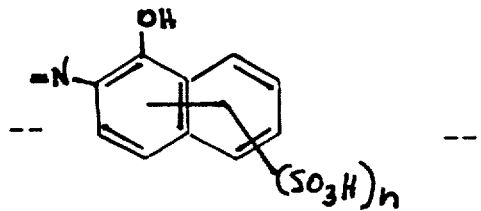 --

UNITED STATES PATENT AND TRADEMARK OFFICE
CERTIFICATE OF CORRECTION

PATENT NO. : 5,233,027

DATED : August 3, 1993

INVENTOR(S) : Hinrichs, et al.

It is certified that error appears in the above-identified patent and that said Letters Patent is hereby corrected as shown below:

Col. 9, line 5    Delete " 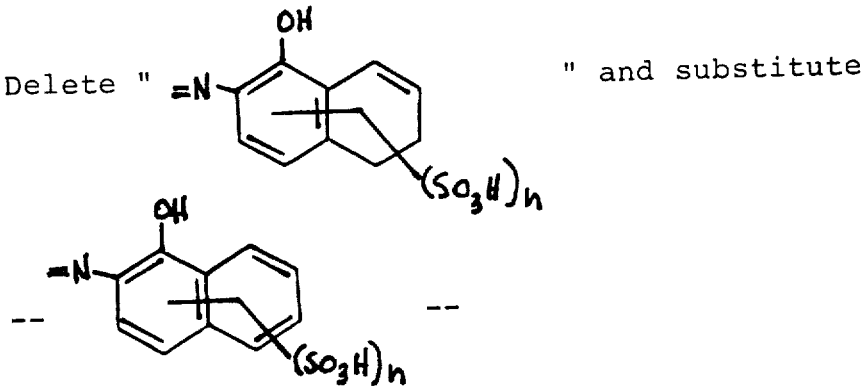 " and substitute

 --

Signed and Sealed this

Seventeenth Day of May, 1994

Attest:

BRUCE LEHMAN

Attesting Officer

Commissioner of Patents and Trademarks